(No Model.)

G. H. BROWN.
FRUIT JAR COVER.

No. 252,721. Patented Jan. 24, 1882.

WITNESSES.
W. A. Beitham
D. L. H. Barclay

INVENTOR
G. H. Brown.
By
N. D. Williams
ATTORNEY.

UNITED STATES PATENT OFFICE.

GEORGE H. BROWN, OF NEW WINDSOR, MARYLAND.

FRUIT-JAR COVER.

SPECIFICATION forming part of Letters Patent No. 252,721, dated January 24, 1882.

Application filed December 15, 1881. (No model.)

*To all whom it may concern:*

Be it known that I, GEORGE H. BROWN, of New Windsor, Carroll county, State of Maryland, have invented certain new and useful Improvements in Fruit-Jar Covers; and I hereby declare the same to be fully, clearly, and exactly described as follows, reference being had to the accompanying drawings, in which—

Figure 1:
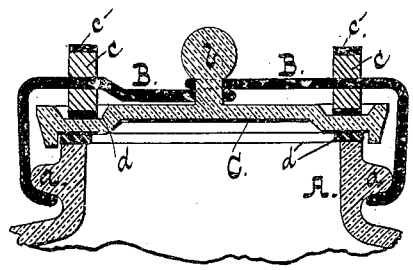
Figure 2:
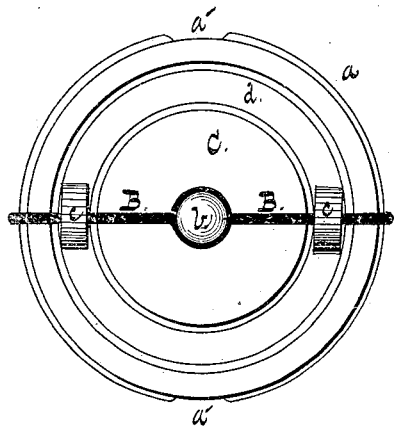

Figure 1 is a central sectional view of the device, and Fig. 2 is a top plan of the same.

My invention relates to covers for fruit or preserve jars; and it has for its object to provide a cover of such construction as to be more readily applied to and removed from the jar than is possible with similar devices as at present constructed.

In fruit-jar covers of that general class which screw down upon the neck of the jar the cover is very liable to stick so tightly to the gum washer as to be very difficult to remove, as the unscrewing of the cover necessitates a lateral movement of its edge or seat upon the washer. I have obviated this by providing the cover with a pivoted bail, which engages with the inclined rib or thread on the jar-neck, and as it is turned laterally draws the cover vertically downward upon the jar. This bail is made in two parts, each being movable about the central pivot independently of the other, whereby a very slight movement of either part of the bail loosens the cover so that it can be removed, and facility is afforded for seating the cover squarely upon the gasket should the thread or rib on the jar-neck be imperfect or uneven.

In the drawings, A is the jar, having ribs *a* of the usual form cut away or terminating at *a'* *a'* to permit of the passage of the ends of the bail B. The latter is made in two parts, pivoted about the knob *b* on the cover C, and carries a pair of rollers, *c c*, having by preference gum tires *c'*. The rollers run in an annular track, *d*, on the cover.

In operation the cover is laid on the jar, the ends of the bails passing down at *a'*, and the cover is seated fairly on the gasket *d'*. The bails are then turned about the pivot, drawing the cover tightly down in place. When it is desired to remove it one of the bails is moved in the reverse direction by turning its roller *c* with the thumb. In applying a tangential thrust at the top of the roller the latter becomes a lever of the second class, and the rotative effect at the bail is double the force applied to the roller. The gum tire subserves a double end. It bites on the glass and prevents the roller from slipping when it is desired to turn it, and constitutes a cushion between what would be otherwise unyielding surfaces in clamping the cover in place.

Instead of forming the inclined surfaces on the jar-neck, the track on which the rollers run may incline upward from two opposite points, and the bails, instead of being made separate, may turn together.

What I claim is—

1. In combination with the jar having the inclined ribs *a*, the cover provided with the bails B B and rollers *c*, substantially as set forth.

2. In combination with the jar having the inclined ribs *a*, the cover C, having a central knob and annular track, the bails B B, and rubber-tired rollers *c c*, as set forth.

GEORGE H. BROWN.

Witnesses:
C. E. LAMBERT,
C. E. NORRIS.